US007184098B2

(12) United States Patent
Pencil et al.

(10) Patent No.: US 7,184,098 B2
(45) Date of Patent: Feb. 27, 2007

(54) CYCLIC DATA SIGNAL AVERAGING SYSTEM AND METHOD FOR USE IN VIDEO DISPLAY SYSTEMS

(75) Inventors: Charles D. Pencil, Novato, CA (US); Michael S. Jin, Novato, CA (US)

(73) Assignee: Spatialight, Inc., Novato, CA (US)

( * ) Notice: Subject to any disclaimer, the term of this patent is extended or adjusted under 35 U.S.C. 154(b) by 521 days.

(21) Appl. No.: 10/782,045

(22) Filed: Feb. 19, 2004

(65) Prior Publication Data

US 2005/0185098 A1 Aug. 25, 2005

(51) Int. Cl.
*H04N 5/21* (2006.01)
*H04N 5/268* (2006.01)

(52) U.S. Cl. .................................. 348/615; 348/705

(58) Field of Classification Search ................ 348/607, 348/615, 705, 706, 554, 624, 584, 722; 370/391, 370/392, 399; *H04N 5/21, 5/268*
See application file for complete search history.

(56) References Cited

U.S. PATENT DOCUMENTS

| | | | | | |
|---|---|---|---|---|---|
| 4,535,352 | A | | 8/1985 | Haskell | 358/16 |
| 4,580,163 | A | | 4/1986 | Hartmeier | 358/140 |
| 4,602,273 | A | | 7/1986 | Carlson | 358/11 |
| 4,608,594 | A | | 8/1986 | Nicholson | 358/11 |
| 4,672,445 | A | | 6/1987 | Casey et al. | 358/140 |
| 4,677,482 | A | | 6/1987 | Lewis, Jr. | 358/140 |
| 4,947,251 | A | | 8/1990 | Hentschel | 358/166 |
| 5,036,395 | A | * | 7/1991 | Reimers | 348/705 |
| 5,166,926 | A | * | 11/1992 | Cisneros et al. | 370/392 |
| 5,182,643 | A | | 1/1993 | Futscher | 358/140 |
| 5,412,436 | A | | 5/1995 | Christopher | 348/700 |
| 5,442,406 | A | | 8/1995 | Altmanshofer et al. | 348/588 |
| 5,495,576 | A | | 2/1996 | Ritchey | 395/125 |
| 5,519,565 | A | | 5/1996 | Kalt et al. | 361/280 |
| 5,534,936 | A | | 7/1996 | Kim | 348/448 |
| 5,883,696 | A | | 3/1999 | Bowers et al. | 352/136 |
| 6,297,848 | B1 | | 10/2001 | Westerman | 348/448 |
| 6,522,362 | B1 | | 2/2003 | Nakamoto et al. | 348/447 |
| 6,628,341 | B1 | | 9/2003 | Staley et al. | 348/607 |
| 6,661,463 | B1 | | 12/2003 | Geshwind | 348/384 |
| 6,664,955 | B1 | | 12/2003 | Deering | 345/418 |
| 2002/0005862 | A1 | | 1/2002 | Deering | 345/694 |
| 2002/0097206 | A1 | | 7/2002 | Willis | 345/87 |
| 2002/0101535 | A1 | | 8/2002 | Swan | 348/448 |
| 2002/0171759 | A1 | | 11/2002 | Handjojo et al. | 348/452 |
| 2003/0095204 | A1 | | 5/2003 | Nakamoto et al. | 348/447 |

* cited by examiner

*Primary Examiner*—Sherrie Hsia

(57) ABSTRACT

A system and method for reducing periodic intensity variation in a video image includes applying input signals representing video image data to multiple circuit components by sequentially shifting the input signals through the circuit components to produce output signals that match corresponding input signals. Matching the output signals to the input signals overcomes the effect of inherent differences in characteristics of analog circuit components. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

21 Claims, 3 Drawing Sheets

CYCLIC DATA SIGNAL AVERAGING SYSTEM AND METHOD FOR USE IN VIDEO DISPLAY SYSTEMS

FIELD OF THE INVENTION

The present invention generally relates to performance enhancement in digital display systems. Specifically, the present invention relates to a system and method for reducing periodic intensity variation in video images due to inherent differences in circuit components along video data paths.

BACKGROUND OF THE INVENTION

In display systems, such as those involving liquid crystal or plasma displays, the use of multiple video lines for signal transmission often produces a periodic intensity variation known as a corduroy effect. The corduroy effect is a result of mismatches among the analog portion of parallel video paths such as the digital-to-analog converters and operational amplifiers. If the multiple video inputs are not balanced (that is, if the equal levels of video signals are not matched among different inputs) a periodic effect will appear in the displayed image. If the multiple video inputs are used to provide the video signal to interleaved sets of columns, a periodic intensity variation ("corduroy" pattern) among columns will appear, especially in the regions where the image contains features with uniform color or shades. If the multiple video inputs are used to provide the video signal to interleaved rows, the periodic effect will appear in the rows of the image.

Mismatches occur along paths with analog components due to a variety of factors. Analog circuit components have inherent differences in device characteristics, such as component tolerances which produce differences in gain and offset. Also, analog circuit components suffer performance degradation over time at varying rates, producing further differences among device components.

One existing method of overcoming the mismatches among analog components is to manually adjust device characteristics such as operational amplifier gain and offset among video paths using a device such as a potentiometer. However, the cost and labor required to tune device characteristics such as gain and offset of multiple components is not desirable in a high volume production environment. Therefore, the complications of balancing multiple video signals to minimize corduroy is costly, time consuming, and difficult.

SUMMARY OF THE INVENTION

The present invention provides, in one embodiment, a method of reducing periodic intensity variation in a video image, comprising rotating a plurality of input signals to a video display circuit so that each input signal in the plurality of input signals is repeatedly sequentially shifted, converting each input signal from digital to analog and amplifying each signal, and separating each amplified signal to produce a plurality of output signals, each output signal in the plurality of output signals having an amplitude matching a corresponding input signal.

In another embodiment, an apparatus for reducing periodic intensity variation in a video image comprises a plurality of input signals, each input signal in the plurality of input signals representing a column of video image data, a first cross-point switch receiving the plurality of input signals, the first cross-point switch repeatedly sequentially shifting each input signal through an analog circuit portion, the analog circuit portion including sets of components each having an digital to analog converter and an operational amplifier, and a second cross-point switch receiving the amplified output of the analog circuit portion, the second cross-point switch separating each amplified output to produce an output signal, such that each output signal has an amplitude that matches a corresponding input signal.

In another embodiment, the present invention provides an apparatus for reducing periodic intensity variation in a video image, comprising means for rotating a plurality of input signals to a video display circuit so that each input signal in the plurality of input signals is repeatedly sequentially shifted, means for converting each input signal from digital to analog and amplifying each signal, and means for separating each amplified signal to produce a plurality of output signals, each output signal in the plurality of output signals having an amplitude that matches a corresponding input signal.

In yet another embodiment, a method of reducing periodic intensity variation in a video image includes providing a plurality of analog input signals to a video display system, rotating the plurality of analog input signals so that each input signal is repeatedly sequentially shifted to produce a plurality of output signals, and demultiplexing and amplifying the plurality of output signals, wherein each output signal in the plurality of output signals has an amplitude matching a corresponding input signal.

The foregoing and other aspects of the present invention will be apparent from the following detailed description of the embodiments, which makes reference to the several figures of the drawings as listed below.

DETAILED DESCRIPTION OF THE EMBODIMENTS

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
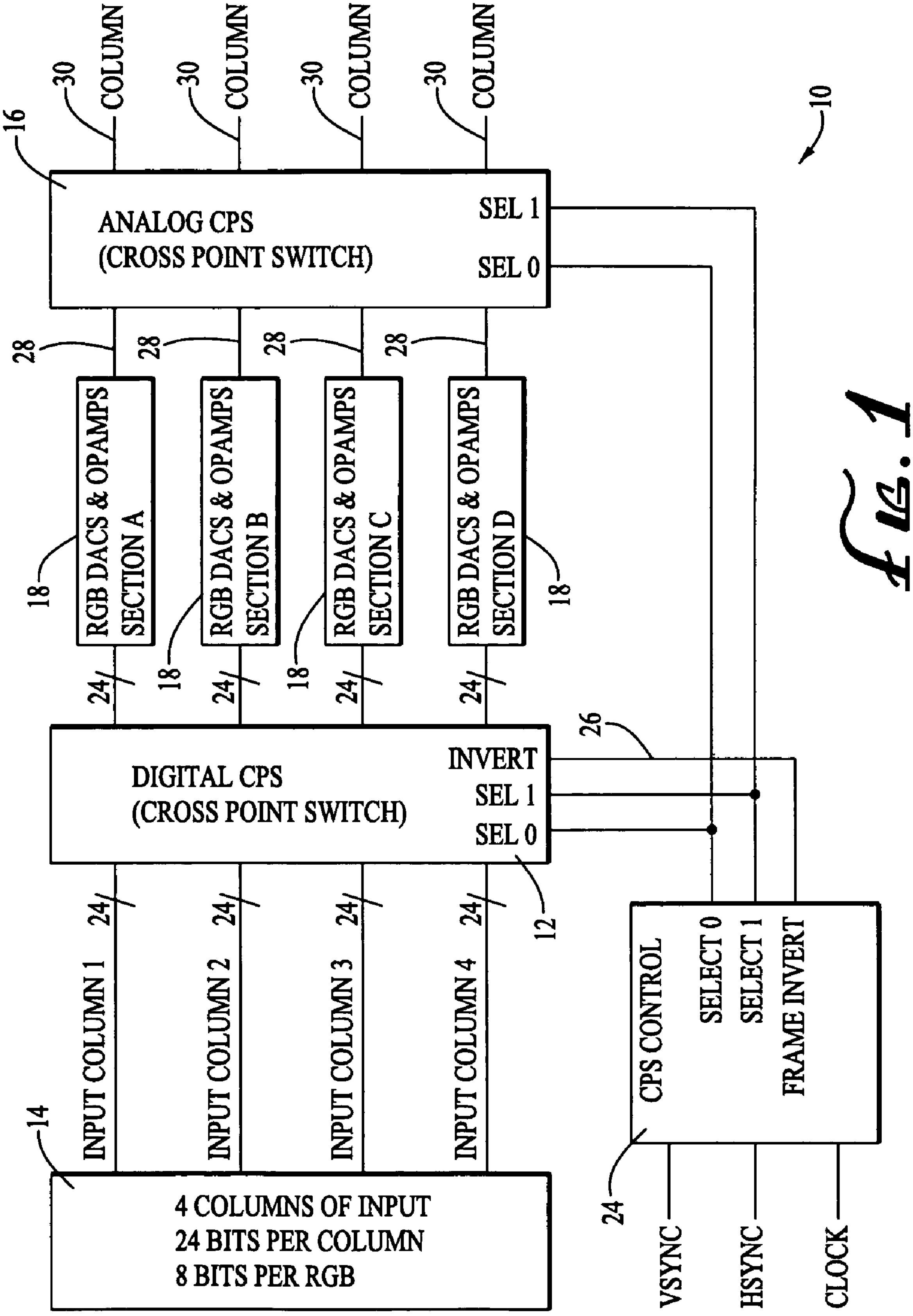
FIG. 1 is a diagram of a circuit for processing video image data according to one embodiment of the present invention.

FIG. 1 is a diagram of a circuit 10 for processing video image data for digital display systems. The circuit 10 includes a digital portion 12 that receives a plurality of input signals 14. Each input signal 14 represents at least one column of video image data. In one embodiment of the present invention, each input signal 14 in the plurality of input signals 14 represents 4 columns of video image data. Each column of data may include 24 bits per column and 8 bits per RGB.

Figure 2:
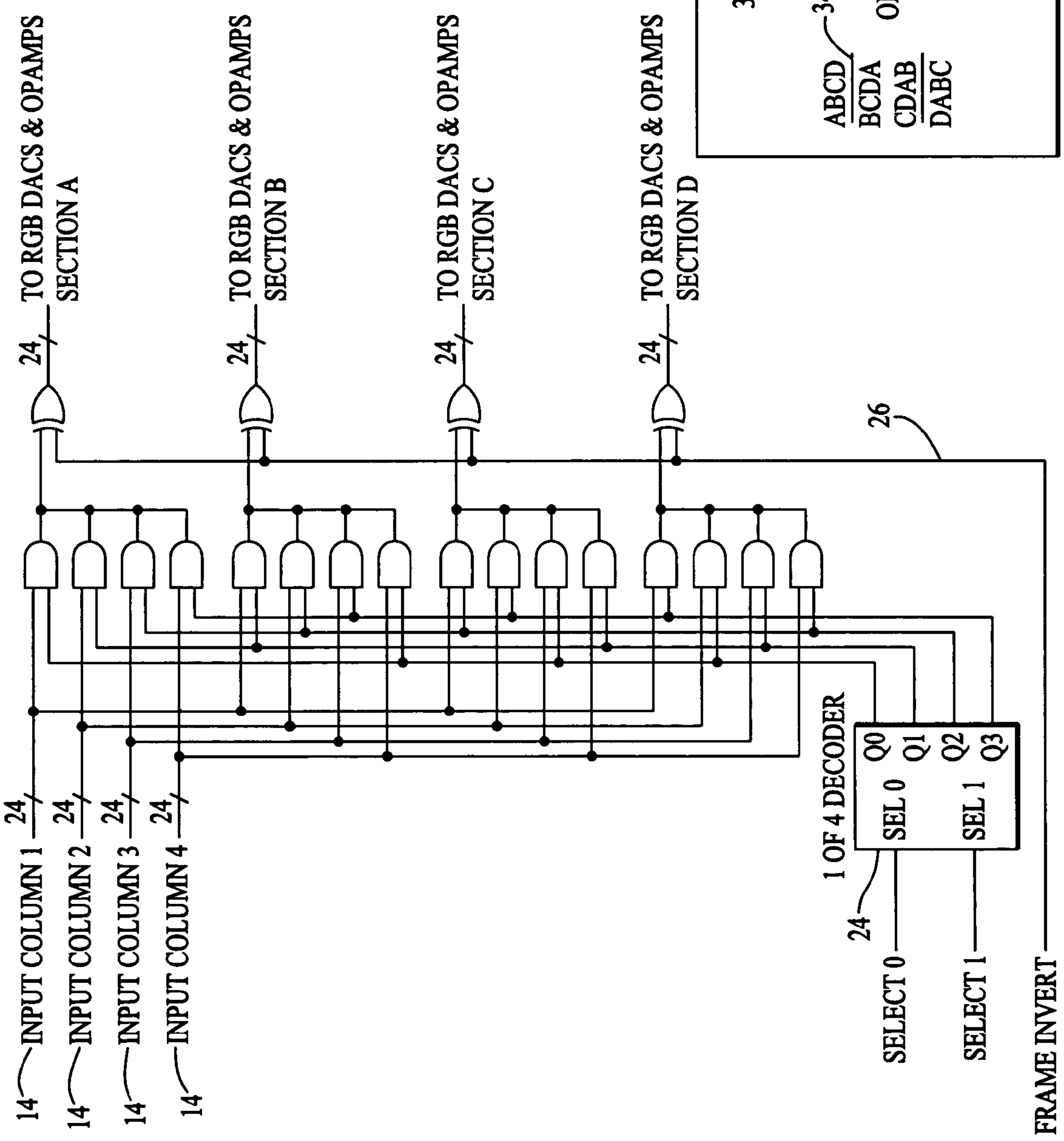
FIG. 2 is a digital portion of the circuit diagram of FIG. 1.

The digital portion 12 may include a digital cross-point switch. Cross-point switch technology is well-known in the art, and the digital cross-point switch of circuit 10 may be any conventional or commercially available digital cross-point switch. In one embodiment the digital portion 12 may also include a multiplexer for aggregating the plurality of input signals 14. In another embodiment, the digital portion 12 may be a Field Programmable Gate Array. In additional embodiments, the digital portion 12 may include any digital logic circuit elements capable of switching or routing the plurality of input signals 14. FIG. 2 is a detailed view of one embodiment showing internal digital logic circuit components in the digital portion 12.

It should be noted that the present invention is not limited to input signals representing specific numbers of columns of data, and it should therefore be understood that the present invention is applicable to input signals representing multiple columns of video image data. Four-column data representation for use in full-resolution, high definition television includes 2 million pixels that are updated at a rate of 120 frames per second. Frames are comprised of lines, which are composed of pixels.

The circuit 10 may be built onto a microchip as part of a larger digital display system for processing video image data. In other embodiments, the circuit 10 may be implemented in a Field Programmable Gate Array (FPGA), in an Application Specific Integrated Circuit (ASIC), or using a digital signal processor. Therefore, the circuit 10 may have either a hardware or software implementation or both, and it is to be understood that the present invention contemplates any suitable implementation for application to digital display systems.

Digital display systems in which the present invention is implemented may include high-definition television (HDTV) or any other medium for displaying high resolution video data. The present invention is also applicable to other applications, such as fiber optic networks in which inherent differences in circuit components negatively affect output signals. It is therefore also understood that the present invention is not intended to be limited to digital display systems.

The circuit 10 of FIG. 1 also includes an analog portion 16. A plurality of analog circuits 18 are included along a path between the digital portion 12 and the analog portion 16. Each analog circuit 18 in the plurality of analog circuits 18 includes a digital-to-analog converter 20 and an operational amplifier 22. Each analog circuit 18 may also include noise reduction circuitry and other filter components.

Figure 3:
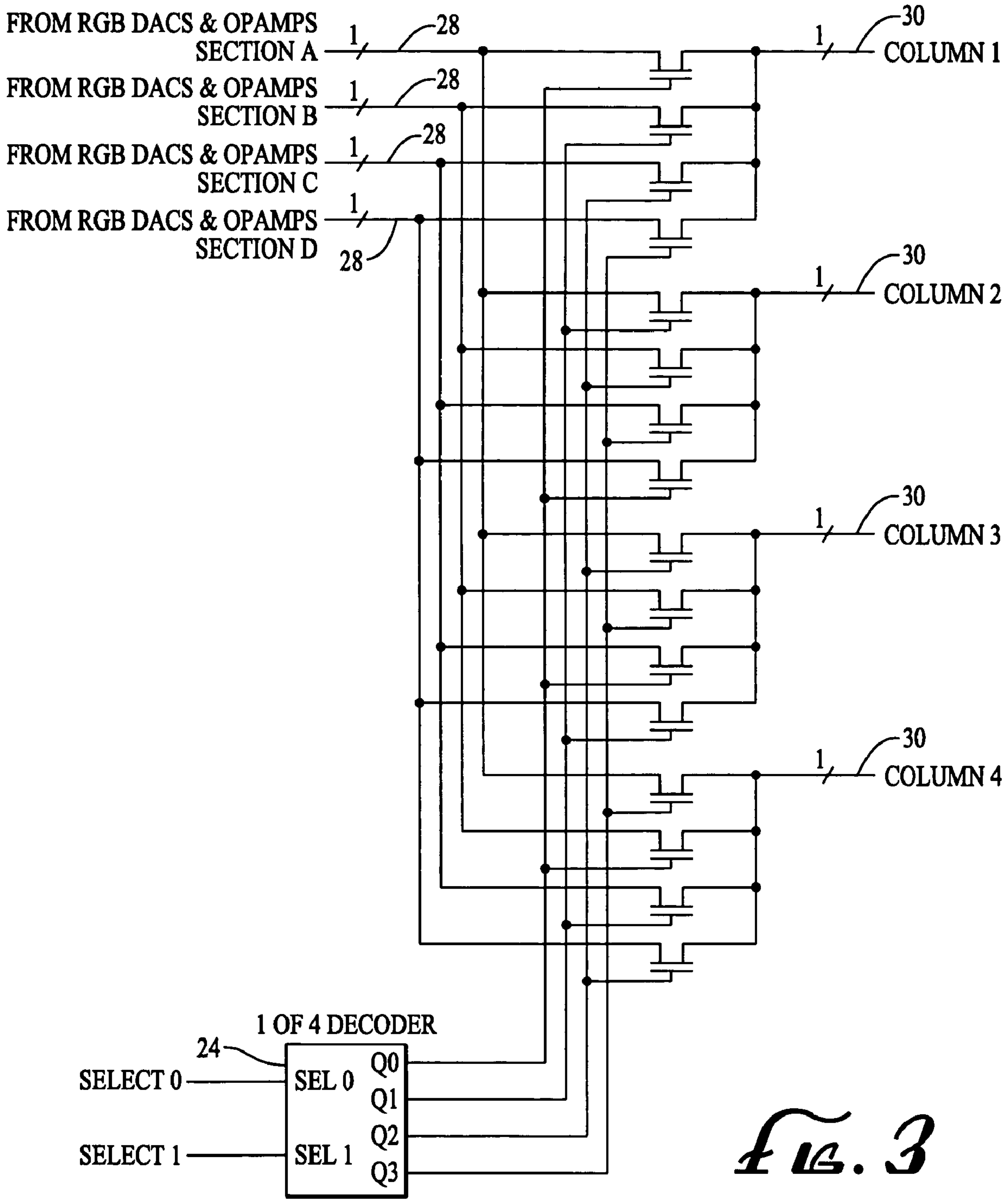
FIG. 3 is an analog portion of the circuit diagram of FIG. 1.

The analog portion 16 may include an analog cross-point switch. Cross-point switch technology is well-known in the art, and the analog cross-point switch of circuit 10 may be any conventional or commercially available analog cross-point switch. In one embodiment the analog portion 16 may also include a demultiplexer for separating the plurality of input signals 14. In additional embodiments, the analog portion 16 may include switches, operational amplifiers, transistors, field effect transistors, capacitors, or any suitable analog components for switching or routing input signals. FIG. 3 is a detailed view of one embodiment showing internal components in the analog portion 16.

The circuit 10 of FIG. 1 also includes a controller 24. The controller 24 is coupled to the digital portion 12 and to the analog portion 16. The controller 24 includes an inverting output 26 which is coupled to the digital portion 12. The inverting output 26 of the controller 24 causes each input signal 14 to be sequentially shifted through each set of digital logic elements in the digital portion 12, so that each input signal is applied to each set of digital logic elements. This process occurs repeatedly, so that the outputs of each set of digital logic elements in the digital portion 12 continually correspond to a different input signal 14 from the plurality of input signals 14. The controller 24 also includes a clock which triggers a rotation of input signals for each frame of video image data.

The components of the analog circuits 18, such as the digital to analog converter 20 and the operational amplifier 22, produce an inherent mismatch in input and output signals due to variations in the components, such as for example differing device characteristics such as offsets and tolerances that vary from component to component, and devices that degrade over time or otherwise suffer performance deterioration. In video systems, particularly in high-resolution LCOS (liquid crystal) display systems, a high frame rate combined with a large number of pixels leads to a high data transmission rate that may be mitigated by dividing the signal to reduce the data rate by implementing column or row interleaving or interlacing. For transmission of full-resolution, high definition television (1920×1080), where 2 million pixels are updated at a rate of 120 frames per second, four or more column interleaving may be needed. In such a case, the mismatch among the corresponding analog circuitry typically leads to undesirable periodic visual inconsistencies known as the "corduroy" effect.

The outputs of each set of digital logic elements provide the plurality of outputs 26 of the digital portion 12. These plurality of outputs 26 are provided to the plurality of analog circuits 18. Because of the continual sequential shifting of the input signals in the digital portion 12, each input signal 14 (or, output signal 26 of the digital portion 12) is sequentially applied to each analog circuit 18 in the plurality of analog circuits 18. Each of these signals is converted by the digital-to-analog converter 20 and then amplified by the operational amplifier 22. Because each operational amplifier 22 has different device characteristics, the application of each input signal 14 to each analog circuit 18 ensures an average output signal having characteristics closely matching those of the input signals 14.

The amplified signals 28 of the plurality of analog circuits 18 are then applied as inputs to the analog portion 16. One embodiment of the individual components of the analog portion 16 is shown in FIG. 3. The outputs 30 of the analog portion 16 corespond to the plurality of input signals 14, such that each output 30 of the analog portion 16 substantially matches an amplitude of a corresponding input signal 14.

In an alternative embodiment, the plurality of input signals may be sequentially shifted by pixel instead of by column of data. For example, each input signal can be separated pixel by pixel by the digital portion 12 and sequentally shifted to be continually applied to each analog circuit 18. Such a pixel interleaving embodiment results in each output pixel matching each input pixel, so that the amplitude of the signal representing the input pixel substantially matches the amplitude of the signal representing the output pixel. In this embodiment, the components of circuit 10 are the same as those described above.

In yet another embodiment, the plurality of input signals 14 are analog signals where the analog signals are switched between multiple columns by the analog portion 16. After being sequentially shifted that plurality of input signals are amplified by a drive circuit, which includes operational amplifiers, producing the plurality of amplified signals 28.

Thus, the concepts of the present invention are also applicable to an analog style system where an analog signal is switched between multiple columns. The drive circuits have parameters that vary from one process to another, and these variances have the same effect upon the analog system viewed image as in a digital style system.

Figure 4:
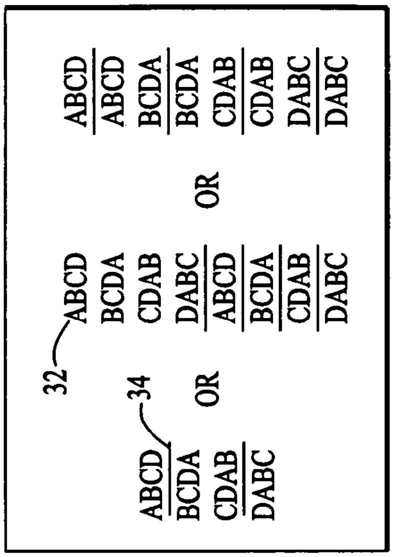
FIG. 4 is a table showing an example of four column signal output sequencing of one embodiment of the present invention.

FIG. 4 is a table showing output sequencing in the circuit 10 of the present invention. In FIG. 4, blocks of bits are represented by the designation "ABCD" or some other combination thereof. FIG. 4 shows the sequence of output bits 32, and indicates that any variations in the input signals 14 are masked by the average of all of the input signals 14. FIG. 4 also shows a VCOM (voltage common) inversion 34 of the output bits 32. VCOM inversion 34, represented by a bar over a particular output sequence, is provided because operation of LCOS displays requires certain DC potential across the input signal.

It is to be understood that other embodiments may be utilized and structural and functional changes may be made without departing from the scope of the present invention. The foregoing descriptions of embodiments of the invention have been presented for the purposes of illustration and description. It is not intended to be exhaustive or to limit the invention to the precise forms disclosed. Accordingly, many modifications and variations are possible in light of the above teachings. For example, many different components can be used to route input signals. Additionally, the processing of the input signals can be performed by column, by frame, by line, or by pixel. It is therefore intended that the scope of the invention be limited not by this detailed description.

The invention claimed is:

1. A method of reducing periodic intensity variation in a video image, comprising:

rotating a plurality of input signals to a video display circuit so that each input signal in the plurality of input signals is repeatedly sequentially shifted;

converting each input signal from digital to analog and amplifying each signal; and separating each amplified signal to produce a plurality of output signals, each output signal in the plurality of output signals having an amplitude matching a corresponding input signal.

2. The method of claim 1, further comprising applying each sequentially shifted input signal to a different analog circuit in a plurality of analog circuits.

3. The method of claim 2, wherein each analog circuit includes a digital-to-analog converter and an operational amplifier.

4. The method of claim 3, wherein the rotating a plurality of input signals includes multiplexing the plurality of input signals.

5. The method of claim 4, wherein the rotating a plurality of input signals includes applying the plurality of input signals to a digital cross-point switch.

6. The method of claim 3, wherein the separating each amplified signal to produce a plurality of output signals includes demultiplexing the plurality of output signals.

7. The method of claim 6, wherein the separating each amplified signal to produce a plurality of output signals includes applying the plurality of output signals to an analog cross-point switch.

8. The method of claim 1, wherein each signal in the plurality of input signals represents a column of video image data.

9. The method of claim 3, wherein each output signal has an amplitude that substantially matches an amplitude of a corresponding input signal, producing time-averaged signals without having to tune each operational amplifier in the plurality of analog circuits to compensate for the effect of differences in the operational amplifiers.

10. An apparatus for reducing periodic intensity variation in a video image, comprising:

a plurality of input signals, each input signal in the plurality of input signals representing a column of video image data;

a first cross-point switch receiving the plurality of input signals, the first cross-point switch repeatedly sequentially shifting each input signal through an analog circuit portion, the analog circuit portion including sets of components each having an digital to analog converter and an operational amplifier; and a second cross-point switch receiving the amplified output of the analog circuit portion, the second cross-point switch separating each amplified output to produce an output signal, such that each output signal has an amplitude that matches a corresponding input signal.

11. The apparatus of claim 10, further comprising a controller coupled to the first cross-point switch and producing an inverting input to the first cross-point switch, the inverting input causing the plurality of input signals to be sequentially shifted so that each input signal is repeatedly applied to a different set of components in the analog circuit portion.

12. The apparatus of claim 11, wherein the first cross-point switch is a digital cross-point switch.

13. The apparatus of claim 11, wherein the first cross-point switch is a multiplexer.

14. The apparatus of claim 11, wherein the second cross-point switch is an analog cross-point switch.

15. The apparatus of claim 11, wherein the analog cross-point switch is a demultiplexer.

16. The apparatus of claim 11, wherein the plurality of input signals include four columns of input.

17. An apparatus for reducing periodic intensity variation in a video image, comprising:

means for rotating a plurality of input signals to a video display circuit so that each input signal in the plurality of input signals is repeatedly sequentially shifted;

means for converting each input signal from digital to analog and amplifying each signal; and means for separating each amplified signal to produce a plurality of output signals, each output signal in the plurality of output signals having an amplitude that matches a corresponding input signal.

18. The apparatus of claim 17, further comprising means for applying each sequentially shifted input signal to a different analog circuit in a plurality of analog circuits.

19. The apparatus of claim 18, further comprising means for converting each sequentially shifted input signal from digital to analog.

20. The apparatus of claim 19, further comprising means for amplifying each sequentially shifted input signal.

21. A method of reducing periodic intensity variation in a video image, comprising:

providing a plurality of analog input signals to a video display system;

rotating the plurality of analog input signals so that each input signal is repeatedly sequentially shifted to produce a plurality of output signals; and demultiplexing and amplifying the plurality of output signals, wherein each output signal in the plurality of output signals has an amplitude matching a corresponding input signal.

* * * * *